United States Patent [19]

Hareyama et al.

[11] Patent Number: 4,744,341
[45] Date of Patent: May 17, 1988

[54] INTERNAL COMBUSTION ENGINE

[75] Inventors: Kisichiro Hareyama; Shokichi Hareyama, both of Iwate, Japan

[73] Assignee: Yugen Kaisha Hareyama Jiko, Japan

[21] Appl. No.: 878,057

[22] Filed: Jun. 24, 1986

[30] Foreign Application Priority Data

Jun. 28, 1985 [JP] Japan ................................ 60-141906

[51] Int. Cl.4 ............................................. F02B 19/02
[52] U.S. Cl. ..................................... 123/256; 123/292
[58] Field of Search ................ 123/291, 292, 256, 293

[56] References Cited

U.S. PATENT DOCUMENTS

| 2,197,106 | 4/1940 | Kammer | 123/292 |
| 3,929,107 | 12/1975 | Renger | 123/292 |
| 4,248,192 | 2/1981 | Lampard | 123/292 |
| 4,401,072 | 8/1983 | Ito | 123/292 |
| 4,424,780 | 1/1984 | Trucco | 123/292 |

FOREIGN PATENT DOCUMENTS

| 357110 | 9/1919 | Fed. Rep. of Germany | 123/292 |
| 334130 | 3/1921 | Fed. Rep. of Germany | 123/292 |
| 445549 | 11/1912 | France | 123/292 |
| 2278920 | 2/1976 | France | 123/292 |
| 167271 | 5/1934 | Switzerland | 123/292 |
| 436824 | 10/1935 | United Kingdom | 123/292 |

Primary Examiner—Ronald B. Cox
Attorney, Agent, or Firm—McGlew and Tuttle

[57] ABSTRACT

An internal combustion engine comprising an activating chamber provided separate from a combustion chamber, a valve disposed between the activating chamber and the combustion chamber, fuel feeding means adapted to feed fuel into the interior of the activating chamber in accordance with a predetermined ignition timing sequence and valve opening and closing control means for opening the valve in accordance with the predetermined ignition timing sequence.

8 Claims, 8 Drawing Sheets

INTERNAL COMBUSTION ENGINE

BACKGROUND OF THE INVENTION

1. Field of the Invention

The present invention relates to an internal combustion engine.

2. Description of the Prior Art

Hitherto known internal combustion engine, for instance, compression ignition type engine is so constructed that liquid fuel is injected directly into a combustion chamber or the like and thereby compression ignition combustion is initiated before mixture gas comprising air and liquid fuel which is sufficiently vaporized after injection is prepared in the uniformly mixed state.

For the reason combustion is achieved unsatisfactorily, resulting in generation of unburnt hydrocarbon in the combustion chamber and exhaustion of black smoke from the compression ignition type engine. This is one of factors for causing atmosphere pollution.

Thus, the present invention has been made with the foregoing background in mind and its object resides in providing an internal combustion engine of the type which assures remarkable reduction of generation of black smoke and hydrocarbon in exhaust gas.

SUMMARY OF THE INVENTION

To accomplish the above object there is proposed according to the present invention an internal combustion engine comprising an activating chamber provided separate from a combustion chamber, a valve disposed between the activating chamber and the combustion chamber, fuel feeding means adapted to feed fuel into the interior of the activating chamber in accordance with a predetermined ignition timing sequence and valve opening and closing control means for opening the valve in accordance with the predetermined ignition timing sequence.

According to the invention the internal combustion engine is so constructed that fuel is previously activated in the activating chamber which is provided separate from the combustion chamber whereby uniformly premixed mixture gas having properties very close those of mixture gas usable for gasoline engine (Otto cycle engine) is obtainable.

Further, according to the invention premixed mixture gas which is satisfactorily activated in the activating chamber is caused to burn after the valve is opened. Thus, the optimum ignition timing can be easily determined by properly controlling the timing relation relative to opening of the valve.

Other objects, features and advantages of the present invention will become more readily apparent from reading of the following description which has been prepared in conjunction with the accompanying drawings.

BRIEF DESCRIPTION OF THE DRAWINGS

The accompanying drawings will be briefly described below.

DETAILED DESCRIPTION OF PREFERRED EMBODIMENTS OF THE INVENTION

Now, the present invention will be described in a greater detail hereunder with reference to the accompanying drawings which illustrate preferred embodiments thereof.

Figure 1:
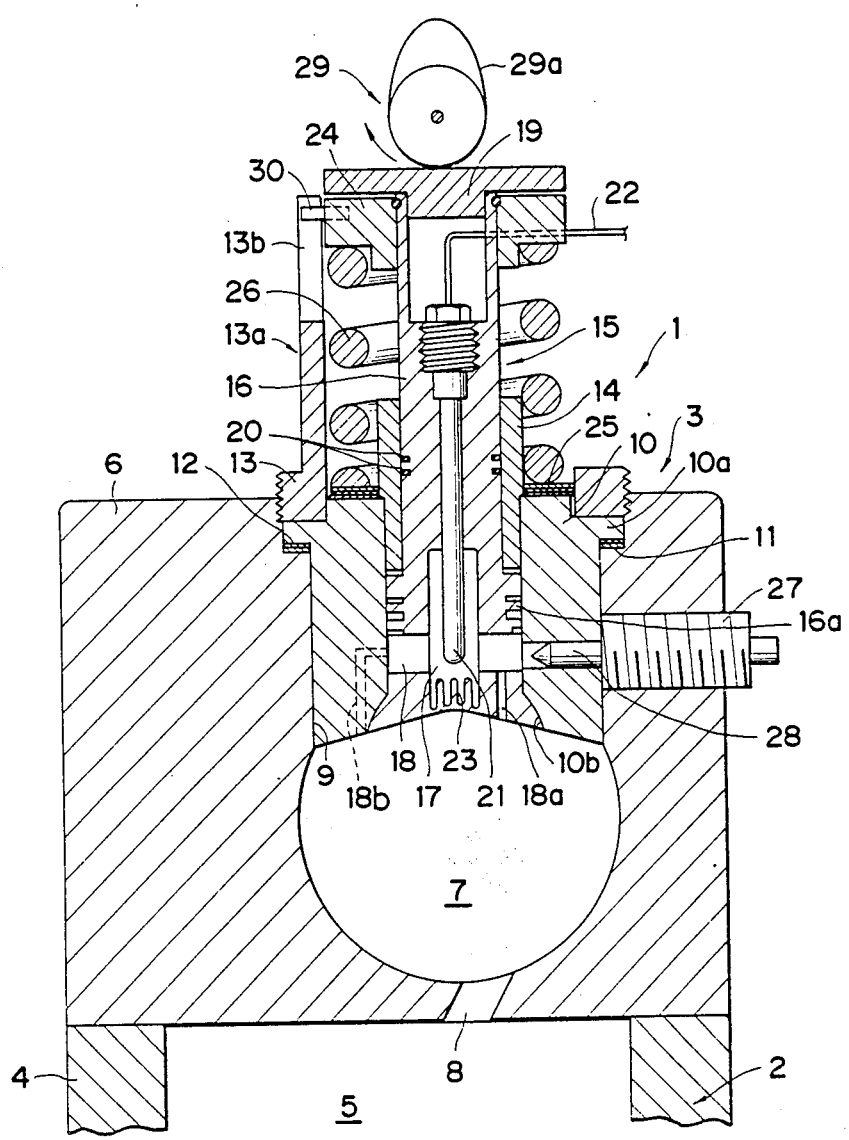
FIG. 1 is a fragmental sectional view of an internal combustion engine in accordance with an embodiment of the invention, particularly illustrating an operative state where a valve is kept closed.
Figure 2:
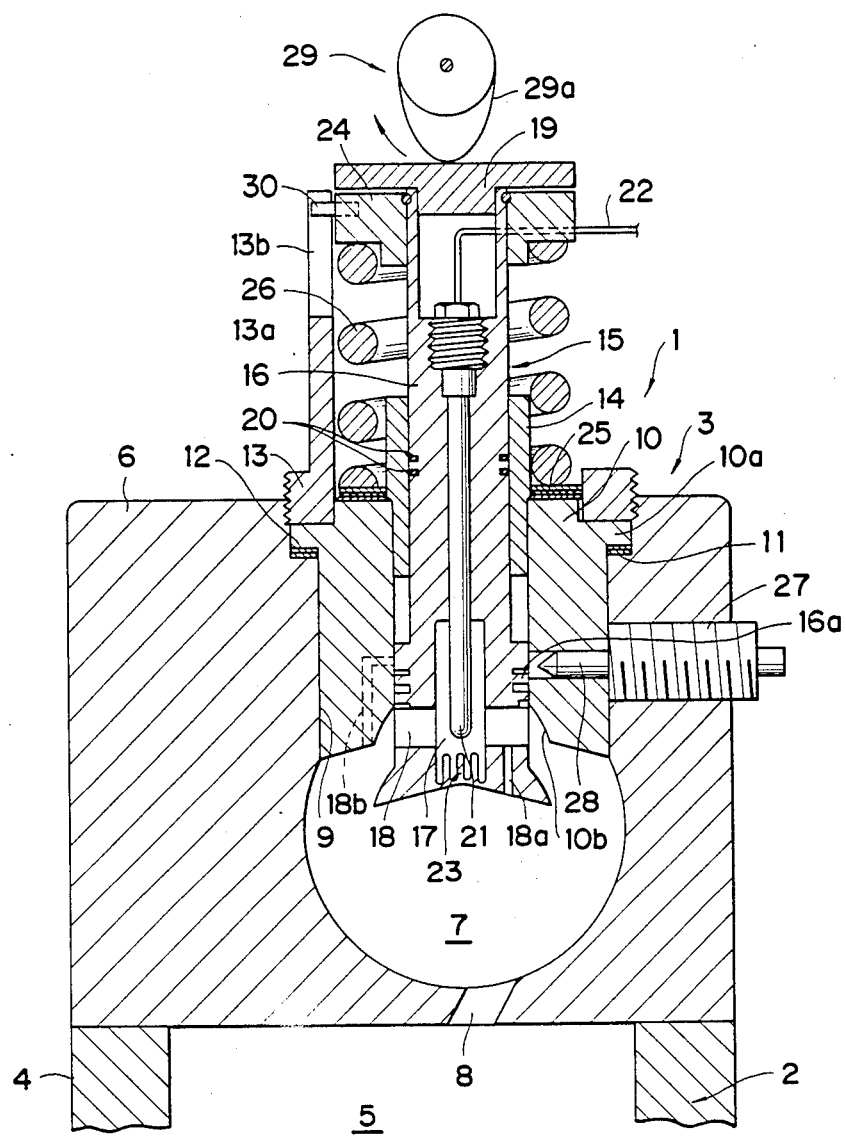
FIG. 2 is a fragmental sectional view of the internal combustion engine in FIG. 1, particularly illustrating another operative state where the valve is kept opened.

FIGS. 1 and 2 illustrate a compression ignition type engine in accordance with an embodiment of the present invention. This compression ignition type engine as identified by reference numeral 1 includes a cylinder portion 2 and a head portion 3.

The cylinder portion 2 comprises a cylinder body 4 in which a combustion chamber 5 is formed, whereas the head portion 3 comprises a head body 6 in which a sub-chamber (precombustion chamber) 7 is formed.

The combustion chamber 5 and the sub-chamber 7 are communicated with one another via an injection port 8 which is formed in the head body 6.

It should be noted that the sub-chamber 7 has a substantially circular cross-sectional configuration in order to assure that swirl is easy to occur.

The head body 6 is formed with a bore 9 into which a cap-shaped valve holding portion 10 is firmly fitted.

The valve holding portion 10 has a flange 10a which is placed on a stepped part 12 of the head portion 6 with a gasket 11 interposed therebetween and then tightly held in the head portion 6 by means of a ring-shaped threaded member 13.

A sleeve-shaped guide member 14 is fitted into the valve holding portion 10 and a valve body 16 constituting a valve 15 is accommodated in the guide member 14 so as to slidably move therethrough in the longitudinal direction (that is, in the vertical direction).

The valve body 16 is formed with a vaporizing chamber 17 at the central part of the lower end thereof and moreover it is formed with a transversely extending activating chamber (premixing chamber) 18 which is communicated with the vaporizing chamber 17. A cam contact plate 19 is disposed at the upper end of the valve body 16.

A plurality of seal rings 20 are fitted around the central part of the valve body 16.

Incidentally, the valve body 16 may have a passage 18a at the lower end part thereof by way of which the activating chamber 18 is communicated with the sub-chamber 7.

The valve body 16 includes a slidable flange 16a at the position located above the activating chamber 18 which is adapted to come in close contact with the inner wall of the valve holding portion 10.

A heater 21 is disposed in the valve body 16 in such a manner that its foremost end is located within the interior of the vaporizing chamber 17. Lead wire 22 extends from the heater 21 to the outside.

As is apparent from the drawing, the vaporizing chamber 17 is formed with a plurality of fins 23 on the bottom thereof.

On the other hand, the valve 15 is normally urged in the upward direction under the effect of resilient force of a compression spring 26 which is disposed in the area as defined between both spring retainers 24 and 25. When the valve body 16 assumes the uppermost position, it is brought in tight contact with a valve seat 10b of the valve holding portion 10.

The head body 6 is equipped with a fuel injection nozzle 27 of which injection portion 28 is directed toward the activating chamber 18.

Further, the engine includes reciprocable means 29 (valve opening and closing control means) which is located above the valve body 16 to reciprocatable or drive displace the latter in the vertical direction in accordance with a predetermined ignition timing sequence.

In the illustrated embodiment the reciprocatable means 29 comprises a rotary cam 29a adapted to be rotated in operative association with a crankshaft or the like and a cam abutment plate 19 against which the rotary cam 29a abuts.

As the rotary cam 29a is rotated, the reciprocable means 29 displaces the valve body 16 in the downward direction against resilient force of the compression spring 26 in accordance with the ignition timing sequence.

A guide 13a having a guide groove or slot 13b formed thereon is made integral with the threaded member 13 and a pin 30 extending from the spring retainer 24 is introduced into the guide groove 13b in such a manner as to slidably move in the vertical direction whereby the valve body 16 is displaced up and down without any occurrence of rotation.

Figure 3:
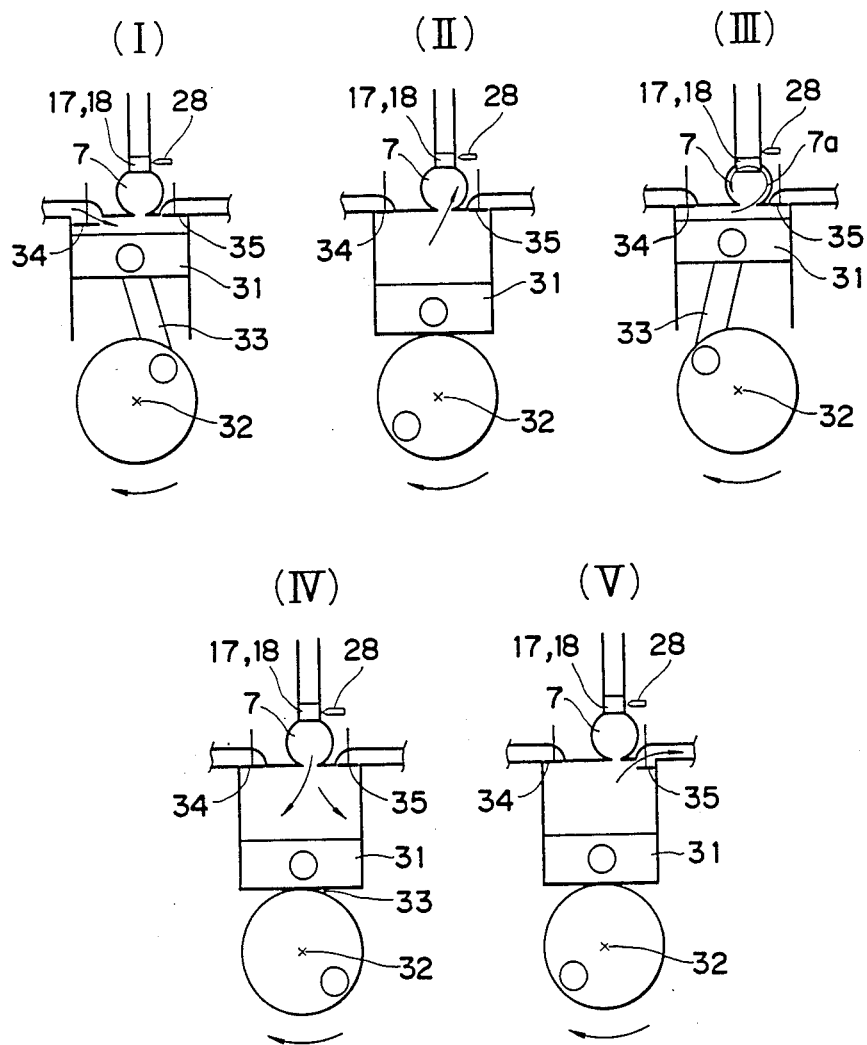
FIGS. 3(I) to (V) are a schematic sectional view of the internal combustion engine in FIGS. 1 and 2 respectively, particularly illustrating how the engine is operated as time elapses.

A piston 31 (not shown in FIGS. 1 and 2) is slidably fitted into the combustion chamber 5 in the cylinder body 4 and it is operatively connected to a crankshaft 32 via a connecting rod 33 (see FIG. 3).

Incidentally, FIG. 1 illustrates an operative state where the valve body 16 is raised up to the uppermost position under the effect of resilient force of the spring 26 and thereby the valve 15 is kept closed, and FIG. 2 illustrates another operative state where the valve body 16 is displaced to the lowermost position in the downward direction in accordance with rotation of the rotary cam 29a and thereby the valve 15 is kept opened.

Next, operation of the compression ignition type engine 1 construction in accordance with this embodiment of the present invention will be described below with reference to FIGS. 3(I) to (V), wherein FIG. 3(I) illustrates an operative state where the engine starts its suction, FIG. 3(II) does an operative state where it starts compression, FIG. 3(III) does an operative state where it starts combustion, FIG. 3(IV) does an operative state where it completes combustion and FIG. 3(V) does an operative state where it starts exhaustion.

First, FIG. 3(I) illustrates operation of the engine in the operative area ranging from a crank angle of zero degree to 180 degrees (from the upper dead point to the lower dead point). While the engine is operated in the above-mentioned operative area, the suction valve 34 is kept opened and the exhaust valve 35 is kept closed.

On the other hand, the valve 15 is kept closed and liquid fuel is fed to both the activating chamber 18 and the vaporizing chamber 17 from the injection nozzle 27.

Fuel fed to the vaporizing chamber 17 via the activating chamber 18 in that way is heated up with the aid of the heater 21 and thereby it starts to vaporize.

At this moment, heat in the sub-chamber 7 is transferred to the vaporizing chamber 17 via the fins 23. In addition, compressed air is introduced into the activating chamber 18 through the communicating hole 18a formed in the valve body 16 of the valve 5 (see FIG. 1) to come in contact with fed fuel whereby activation of the fed fuel is promoted.

Next, while the engine is operated in the operative area ranging from a crank angle of 180 degrees to 360 degrees, each of the suction valve 34, the exhaust valve 35 and the valve 15 is kept closed as shown in FIG. 3(II) whereby compression stroke is carried out.

During compression stroke, mixture gas comprising fuel satisfactorily vaporized in the vaporizing chamber 17 of the valve 15 and air is properly prepared in the operative area ranging, for instance, from 279 degrees to 330 degrees, while swirl 7a is produced in the sub-chamber 7.

Thereafter, the valve body 16 is displaced downwardly by depressing it with the rotary cam 29 just before the engine assumes a crank angle of 360 degrees, while both the suction valve 34 and the exhaust valve 35 are kept closed, as shown in FIG. 3(III).

As the valve body 16 is displaced downwardly in that way, both the vaporizing chamber 17 and the activating chamber 18 become communicated with the sub-chamber 7 and thereby the valve 15 is brought in the opened state.

At this moment mixture gas prepared by satisfactory vaporization of fuel in both the vaporizing chamber 17 and the activating chamber 18 is dispersed within the interior of the sub-chamber 7 under the influence of swirl 7a and it is then introduced into the combustion chamber 5 through the injection port 8.

Thus, mixture gas is fed to heat source of compressed air in the combustion chamber 5 whereby the engine starts combustion in the operative area located in the proximity of a crank angle of 360 degrees.

When the engine assumes a crank angle of 540 degrees, the valve 15 is brought in the closed state again under the effect of cooperation of the rotary cam 29 with the compression spring 26 and thereby combustion stroke is completed (see FIG. 3(IV)).

Next, as shown in FIG. 3(V), the exhaust valve 35 becomes opened and exhaust gas in both the combustion chamber 5 and the sub-chamber 7 is discharged to the outside via the exhaust valve 35 in the operative area ranging from a crank angle of 540 degrees to 720 degrees.

By repeating a series of strokes as mentioned above the crankshaft 32 continues to rotate.

As will be readily apparent from the above description, the compression ignition type engine 1 constructed in the above-described manner has advantageous features that fuel can be burnt completely and an amount of dark smoke contained in exhaust gas can be reduced remarkably, since liquid fuel is satisfactorily vaporized in both the vaporizing chamber 17 and the activating chamber 18 with the aid of the heater 21 to prepare mixture gas of fuel and air and thus prepared ideal mixture gas is then introduced into both the sub-chamber 7 and the combustion chamber 5 to carry out explosion and expansion.

In the above-described embodiment a passage 18a through which compressed air is introduced into the activating chamber 18 for the purpose of satisfactorily vaporizing liquid fuel there is formed in the valve body 16 as represented by real lines. However, the present invention should not be limited only to this. Alternatively, it may be formed in the valve holding portion 10 as identified by reference numeral 18b and dotted lines in FIGS. 1 and 2.

Since the engine is so constructed in accordance with the above-described embodiment that liquid fuel is vaporized in the vaporizing chamber by heating it with the aid of heating means to prepare mixture gas of fuel and air and thus prepared mixture gas is then smoothly dispersed within the interior of the sub-chamber under the influence of swirl flow of compressed air in the sub-chamber while the activating chamber in the valve body is communicated with the sub-chamber, delay of ignition of fed fuel can be reduced remarkably to a negligible level even when the engine is operated at a relatively low compression ratio, compaired with any conventional compression ignition type engine. As a result, the engine of the invention assures reduction of rate of production of black smoke in exhaust gas, reduction of production of nitrogen oxide, reduction of occurrence of diesel knock and designing of the engine in smaller dimensions with reduced weight.

Further, since the compression ignition type engine is operated in the optimum operative state in accordance with the above-described embodiment, inexpensive fuel such as heavy oil, alcohol or the like can be used as liquid fuel, resulting in the engine being operated at a high economical efficiency.

Figure 4:
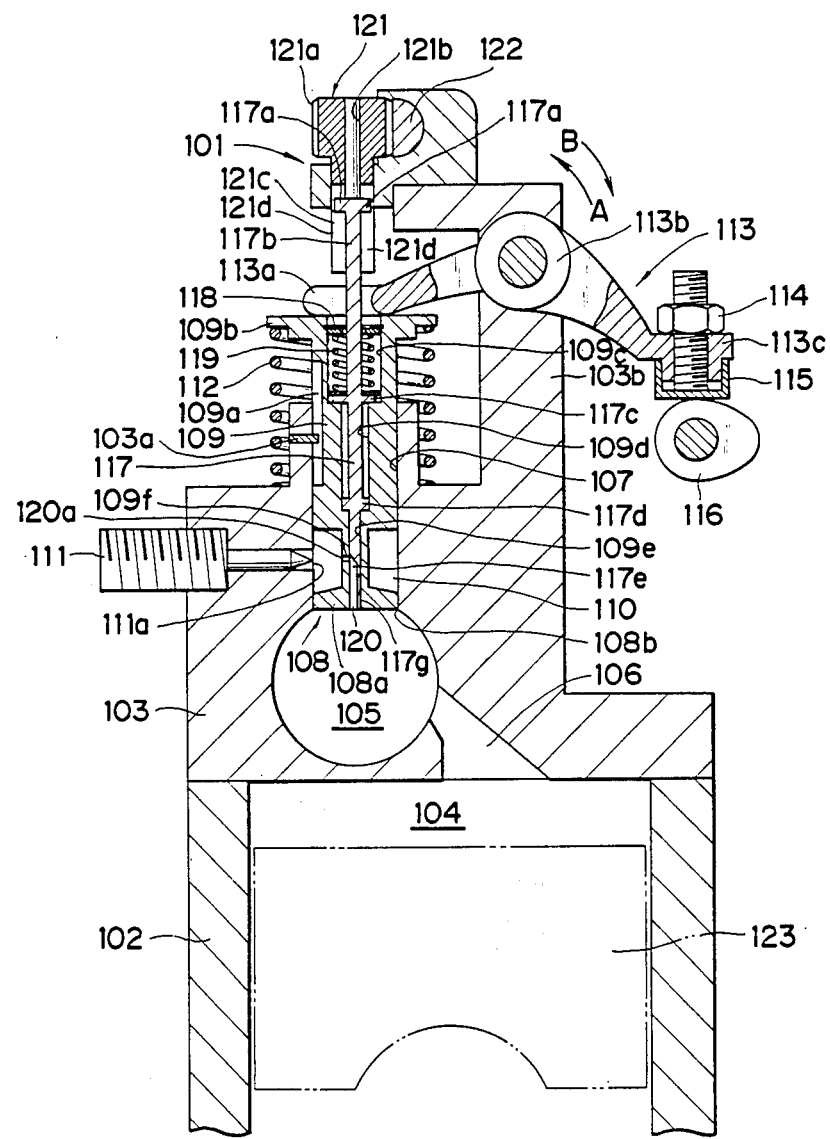
FIG. 4 is a fragmental sectional view of an internal combustion engine in accordance with other embodiment of the invention.
Figure 5:
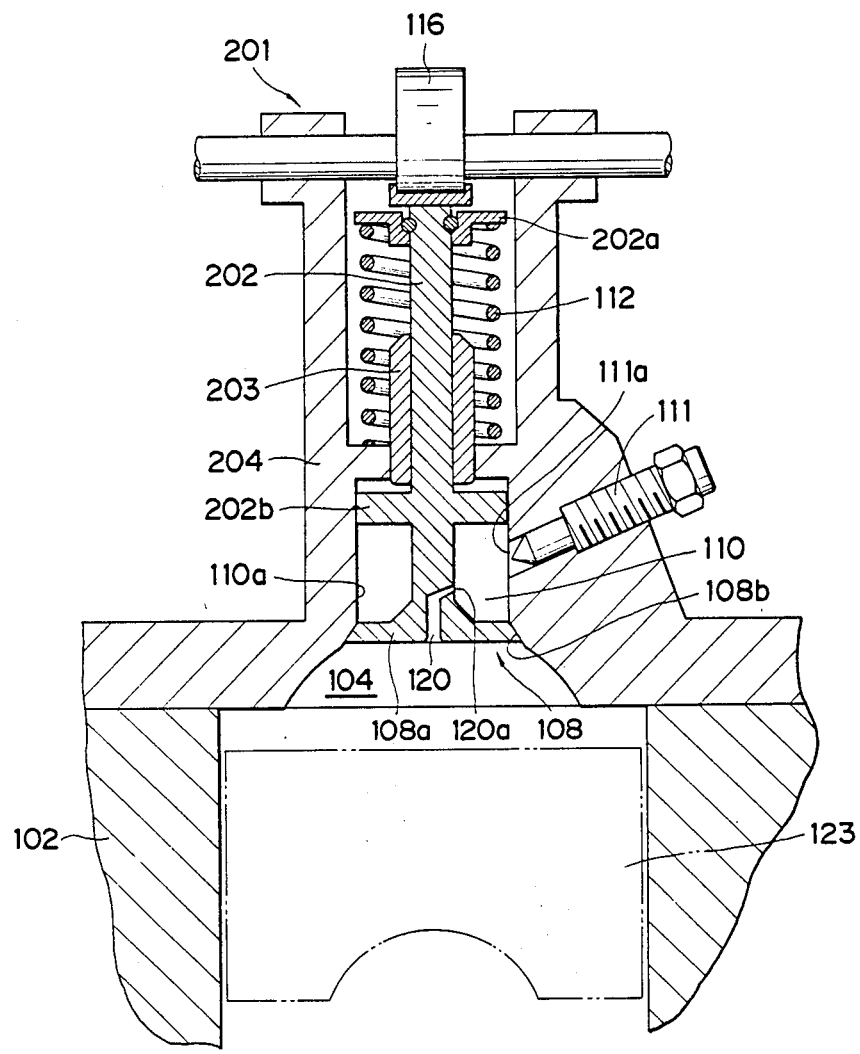
FIG. 5 is a fragmental sectional view of an internal combustion engine in accordance with another embodiment of the invention.

Next, FIGS. 4 and 5 illustrate examples of four-cycle compression ignition type engine to which the present invention is applied. The engine as identified by reference numeral 101 includes a cylinder portion 102 and a head portion 103.

A main combustion chamber 104 is formed in the cylinder portion 102, while a sub-chamber (precombustion chamber) 105 is formed in the head portion 103.

The main combustion chamber 104 and the sub-chamber 105 are communicated with one another via a bore 106 which is formed in the inclined state in the head portion 103.

To assure that swirl is easy to be produced, the sub-chamber 105 is designed in the substantially circular cross-sectional configuration.

The head portion 103 is formed with a bore 107 and a substantially cylindrical member 109 having a valve body 108a integrally secured to the lower end thereof is slidably accommodated in the bore 107.

The cylindrical member 109 has a longitudinally extending groove 109a formed on the outer surface thereof and the head portion 103 is provided with a projection 103a adapted to be slidably fitted into the groove 109a. This leads to a result that the cylindrical member 109 is displaced up and down relative to the head portion 103 without any occurrence of rotation while its slidable movement is guided in the vertical direction by means of the projectio 103a.

An annular activating chamber (premixing chamber) 110 is formed around the lower end part of the cylindrical member 109.

Further, a valve seat 108b is formed at the lower end of the bore 107 in the head portion 103 and a valve 108 is constituted by a combination of the valve seat 108b and the valve body 108a in the area as defined between the sub-chamber 105 and the activating chamber 110.

To inject into the activating chamber 110 fuel fed from a fuel chamber injection apparatus (not shown) a fuel injection nozzle 111 is disposed in the wall structure which surrounds the activating chamber 110.

The upper end 109b of the cylindrical member 109 is radially expanded to build a spring retainer and a spring 112 is disposed in the area as defined between the upper end 109b and the head portion 103.

The cylindrical member 109 is normally urged in the upward direction together with the valve body 108a under the effect of resilient force of the spring 112.

The bifurcated end of a rocker arm 113 abuts against the upper end 109b of the cylindrical member 109.

As is apparent from the drawing, the rocker arm 113 is supported turnable about the central part 113b on an extension 103b which extends upwardly from the one end of the head portion 103.

The rocker arm 113 has a tappet 115 at the other end 113c thereof of which amount of downward projection can be adjusted as required by means of an adjuster nut 114.

The tappet 115 abuts against a cam 116 adapted to be rotated by rotational force transmitted from a crankshaft (not shown) via power transmission means which is not shown.

As the cam 116 is rotated, the one end 113a of the rocker arm 113 is reciprocably displaced up and down and thereby the cylindrical member 109 is reciprocably displaced up and down in compliance with displacement of the one end 113a of the rocker arm 113.

Obviously, upward and downward displacement of the cylindrical member 109 causes the valve 108 to be opened and closed.

As will be apparent from the drawing, the cylindrical member 109 is formed with a hole 109c having larger diameter, a hole 109d having intermediate diameter and a hole 109e having smaller diameter which extend along the center axis of the cylindrical member 109 and are communicated with one another.

Further, the cylindrical member 109 is formed with a hole 109f on the inner wall of the hole 109e in order to establish communication between the hole 109e and the activating chamber 110 therethrough.

It should be noted that the hole 109f is located in horizontal alignment with the injection port 111a of the fuel injection nozzle 111.

A shaft 117 is rotatably fitted through the holes 109c, 109d and 109e in the cylindrical member 109.

Specifically, the shaft 117 comprises an upper end part 117b with an opposing pair of projections 117a formed thereon, a larger diameter part 117c formed at the position located in the vicinity of the middle, an intermediate diameter part 117d formed at the position located in the vicinity of the lower end, a lower end part 117f having a tapered bottom 117e and a rod-shaped extension 117g extending downwardly further from the lowermost end of the bottom 117e.

The larger diameter part 117c, the intermediate diameter part 117d and the lower end part 117f of the shaft 117 are sealably fitted into the holes 109c, 109d and 109e of the cylindrical member 109.

A washer 118 is fitted onto the shaft 117 in the hole 109c at the position located above the larger diameter part 117c so that a spring 119 is disposed in the area as defined between the washer 118 and the larger diameter part 117c.

The shaft 117 is normally urged downwardly relative to the cylindrical member 109 under the effect of resilient force of the spring 119. Thus, the bottom 117e of the lower end part 117f is located at the position in alignment with the hole 109f and the rod-shaped extension 117g is brought in contact with the inner wall of the hole 109e in the lower area of the latter.

By virtue of the arrangement made in that way a passage 120 by way of which the sub-chamber 105 and the activating chamber 110 are communicated with one another is built by a combination of the lower end part of the hole 109e in the cylindrical member 109 and the hole 109f and an outlet port 120a of the passage 120 is directed toward the injection port 111a of the fuel injection nozzle 111.

The upper end part 117b of the shaft 117 is detachably connected to a pinion member 121 with gear teeth 121a formed at the upper part thereof.

The pinion member 121 is formed with a through hole 121b which extends along the center axis of the pinion member 121 and a pair of tangentially extending cutouts 121d are formed at the lower end part 121c of the pinion member 121 with the through hole 121b interposed therebetween while they are opened downwardly.

The upper end part 117b of the shaft 117 is inserted into the through hole 121b by fitting the projections 117a of the upper end part 117b into the cutouts 121d of the pinion member 121.

The projections 117a of the shaft 117 are slidable in the vertical direction relative to the cutouts 121b of the pinion member 118, while the upper end part 117b of the shaft 117 is also slidable in the vertical direction relative to the through hole 121b of the pinion member 121.

The gear teeth 121a of the pinion member 121 mesh with a control rack 122 extending from a fuel feed rate increase and decrease mechanism of a fuel injection apparatus which is not shown in the drawing (It should be noted that the fuel feed rate increase and decrease mechanism is of hitherto known type and therefore no detailed description will be required.).

As the control rack 122 is caused to slide during acceleration or the like, the pinion member 121 is rotated and thereby the shaft 117 is also rotated.

An amount of overlapping of the bottom 117e of the lower end part 117f and the hole 109e varies in dependence on an extent of rotation of the shaft 117, resulting in an amount of throttling of the passage 120 being adjusted as required.

Next, operation of the compression ignition type engine as constructed in the above-mentioned manner will be described below.

While the compression ignition type engine 101 is operated during compression stroke, compressed air in the main combustion chamber 104 is blown into the interior of the sub-chamber 105 via the bore 106 to generate swirl therein. Compressed air thus blown into the sub-chamber 105 is blown further into the activating chamber 110 via the passage 120. At this moment compressed air delivered through the passage 120 is blown toward the injection port 111a of the fuel injection nozzle 111 which serves to inject fuel in the course of compression stroke of the compression ignition type engine 103 and thereby it collides against fuel injected from the fuel injection nozzle 111. As a result, vaporizing of fuel is promoted. Then, some fuel not vaporized enough is positively vaporized by heater 110a provided in the activating chamber 110.

On the other hand, a flow rate of compressed air to be introduced into the activating chamber 110 via the passage 120 is determined by an amount of throttling of the passage 120 which varies in dependence on the rotational position of the shaft 117 adapted to be rotated by means of the control rack 122.

It should be added that as the shaft 117 is rotated, the outer surface of the rod-shaped extension 117g slides around the inner wall surface of the hole 109e and thereby carbon or the like foreign material deposited on the inner wall surface of the hole 109e are peeled off.

When the piston 123 in the cylinder 102 reaches the position in the proximity of the upper dead point, the rocker arm 113 is caused to turn in the A direction and as the one end 113a of the rocker arm 113 is lowered, the cylindrical member 109 is displaced downwardly until the valve 108 is opened. This leads to a result that the activating chamber 110 becomes communicated with the sub-chamber 105 and thereby mixture gas in the activating chamber 110 is dispersed into the interior of the sub-chamber 105 under the influence of swirl generated in the latter. Thus, combustion is initiated while activating of mixture gas is promoted.

Combustion in the sub-chamber 105 proceeds quickly and combustion gas is blown into the main combustion chamber 104 via the bore 106 whereby combustion takes place in the main combustion chamber 104.

When the engine reaches the operative position in the proximity of the end of exhaust stroke, the rocker arm 113 is turned in the B direction and thereby the valve 108 is closed.

As will be readily apparent from the above description, any contour of the cam 116 is acceptable as long as it is so designed that the valve 108 is opened at the operative position located in the proximity of the end of compression stroke and it is closed at the operative position located in the proximity of the end of exhaust stroke. Basically, it is determined in consideration of the number of revolutions of the cam 116 and other factors.

FIG. 5 illustrates an internal combustion engine in accordance with another embodiment of the present invention. Same or similar components as those shown in FIG. 4 are identified by same reference numerals and their repeated description will not be required.

In this embodiment the internal combustion engine (compression ignition type engine) 201 includes a valve 108 which is adapted to open and close in the same timing relation as in the case of the compression ignition type engine 101 in the foregoing embodiment.

A rod-shaped member 202 having a valve body 108a integrally formed at the lower end thereof is formed with disc-shaped projections at both the upper end 202a and the middle 202b.

The rod-shaped member 202 is slidably supported in the head portion 103 with the aid of a guide member 203.

A spring 112 is disposed in the area as defined between the upper end 202a and the head portion 204 and thereby the rod-shaped member 202 is normally urged in the upward direction (in the direction of closing of the valve 108) under the effect of resilient force of the spring 112.

An activating chamber 110 which is surrounded by the head portion 204 is formed in the area as defined between the middle part 202b of the rod-shaped member 202 and the valve body 108a. The middle part 202b of the rod-shaped member 202 is sealably accommodated in the activating chamber 110 so as to slide in the vertical direction along the inner wall surface 110a of the activating chamber 110.

The valve body 108a is formed with a passage 120 by way of which both the activating chamber 110 and the main combustion chamber 104 are communicated with one another.

To promote activating of fuel injected from the fuel injection nozzle 111, the outlet port 120a of the passage 120 is directed toward the injection port 111a of the fuel injection nozzle 111 in the same manner as in the foregoing embodiments.

By virtue of the arrangement made in that way compressed air which is blown from the main combustion chamber 104 into the activating chamber 110 via the passage 120 collides against fuel injected from the fuel injection nozzle 111.

The upper end of the rod-shaped member 202 abuts against a cam 116 adapted to be rotated by means of a crankshaft which is not shown in the drawing.

As the cam 116 is rotated, the valve 108 is opened in the same timing relation as in the foregoing embodiments.

As the middle part 202b of the rod-shaped member 202 is displaced downwardly while the valve 108 is kept opened, mixture gas in the activating chamber 110 is forcibly introduced into the main combustion chamber 104.

In this embodiment the passage 120 is so designed that it has a short length and moreover it is bent at a small inclination angle. This makes it possible to introduce compressed air from the main combustion chamber into the activating chamber 110 within a very short period of time.

Figure 6:
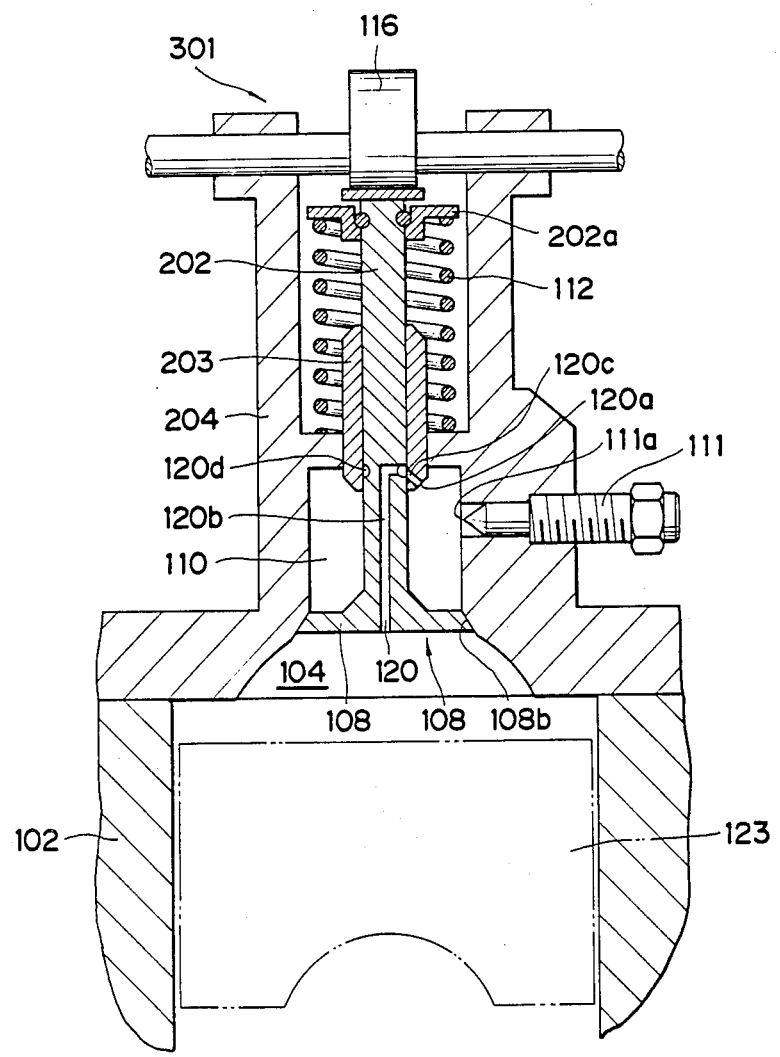
FIG. 6 is a fragmental sectional view of an internal combustion engine in accordance with further another embodiment of the invention.

FIG. 6 illustrates an internal combustion engine in accordance with further another embodiment of the present invention. Same or similar components as those shown in FIG. 5 are identified by same reference numerals and their repeated description will not be required.

In this embodiment the internal combustion engine (compression ignition type engine) 301 is different from that in the foregoing embodiment only in respect of the fact that the outlet port 120a of the passage 120 is located at the lower end of the guide member 203.

As is apparent from the drawing, the passage 120 comprises a hole 120b formed in the rod-shaped member 202 and a hole 120c formed in the guide member 203. It should be noted that an annular groove 120d is formed on the outer surface of the rod-shaped member 202 at the position corresponding to the upper end of the hole 120b and thereby communication is established between both the holes 120b and 120c via the annular groove 120d. Thus, communication between both the holes 120b and 120c is maintained irrespective of how the rod-shaped member 202 is rotated relative to the guide member 203.

The outlet port 120a of the passage 120 is directed toward the injection port 111a of the fuel injection nozzle 111 in the same manner as in the foregoing embodiments whereby activating of fuel injected from the fuel injection nozzle 111 is promoted.

Figure 7:
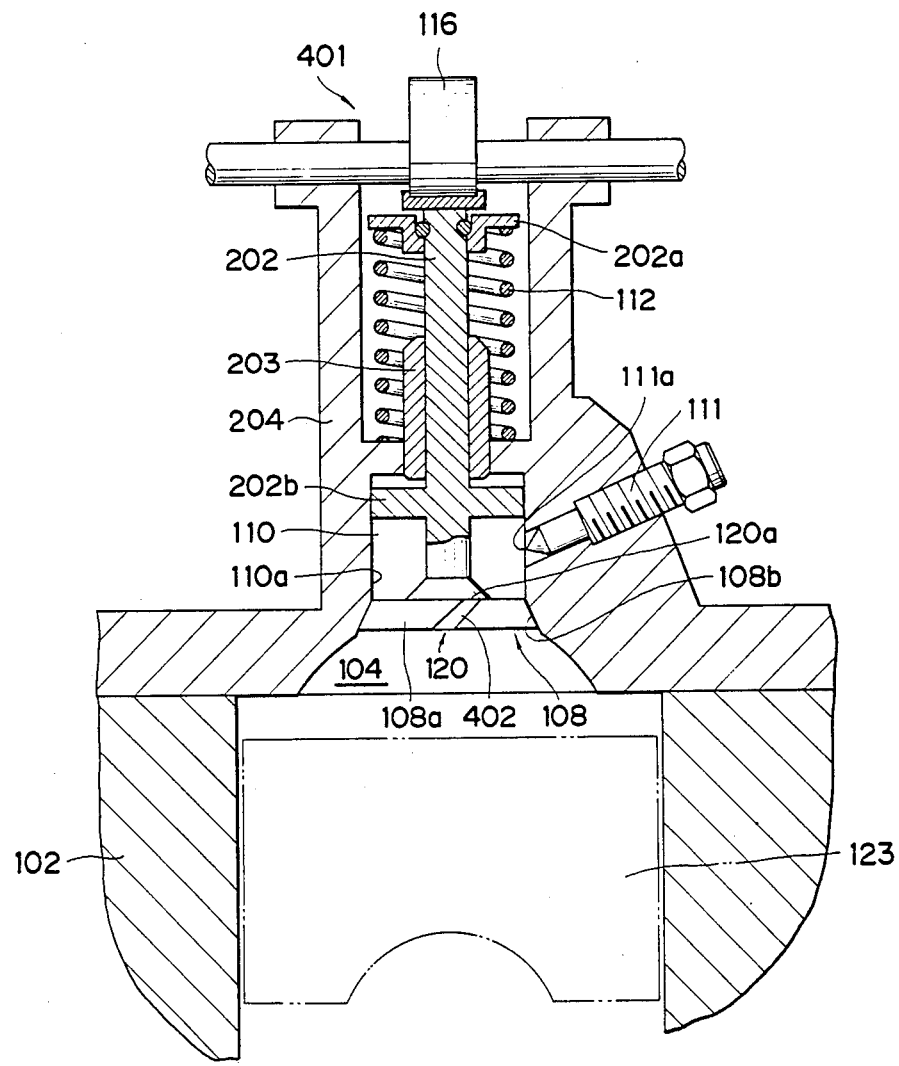
FIG. 7 is a fragmental sectional view of an internal combustion engine in accordance with still further another embodiment of the invention.

FIG. 7 illustrates an internal combustion engine in accordance with further another embodiment of the present invention. Same or similar components as those shown in FIG. 5 are identified by same reference numerals and their repeated description will not be required.

In this embodiment the internal combustion engine (compression ignition type engine) 401 is different from that in the foregoing embodiments only in respect of the fact that the passage 120 is constituted by a combination of a groove 402 formed on the tapered outer surface of the valve body 108a and a valve seat 108b. The groove 402 is so designed that the outlet port 120a of the passage is directed toward the injection port 111a of the fuel injection nozzle 111.

In the illustrated embodiment a single groove 402 is formed but the present invention should not be limited only to this. Any required number of grooves 402 may be formed.

This embodiment has an advantageous feature that the present invention can be applied to an internal combustion engine of the type which is originally formed with no passage, because a passage 120 can be easily formed merely by forming a groove 402 on the outer surface of the valve body 108a.

Figure 8:
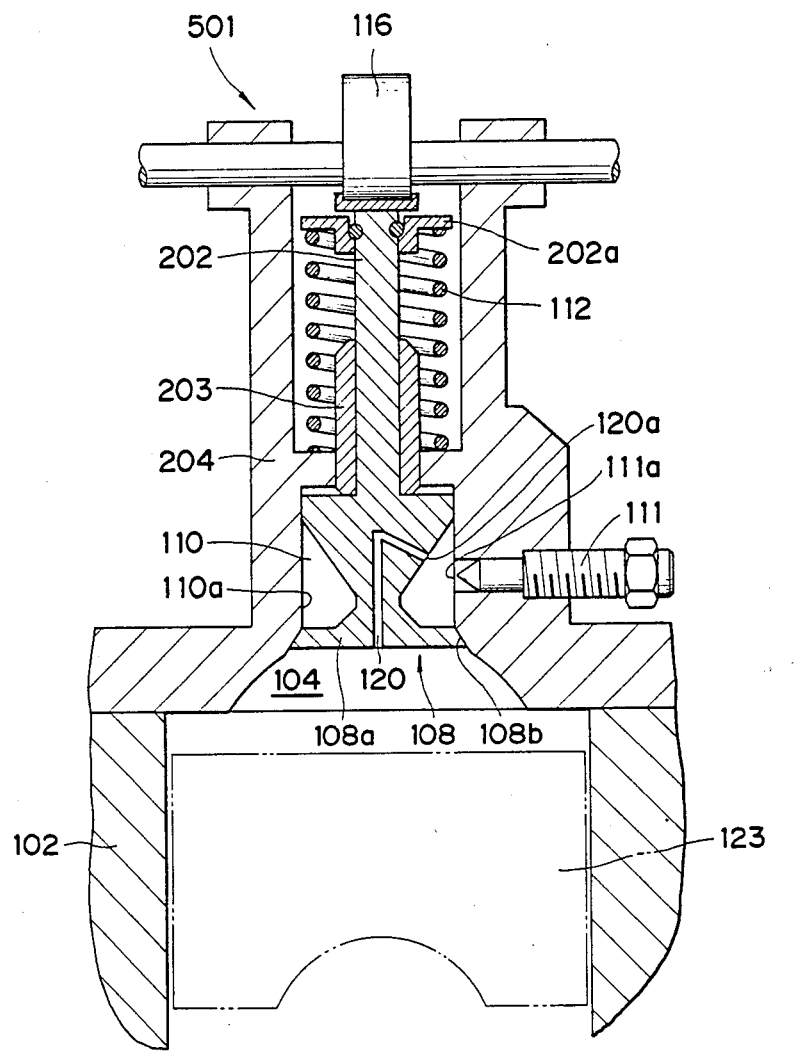
FIG. 8 is a fragmental sectional view of an internal combustion engine in accordance with yet further another embodiment of the invention.

Finally, FIG. 8 illustrates an internal combustion engine (compression ignition type engine) in accordance with still further another embodiment of the present invention. Same or similar components as those shown in FIG. 5 are identified by same reference numerals and their repeated description will not be required.

In this embodiment the internal combustion engine (compression ignition type engine) 501 is different from that in the foregoing embodiments only in respect of the fact that the middle part 202b of the rod-shaped member 202 having a valve body 108 integrally formed at the lower end thereof is designed in the inverted conical configuration and the passage 120 is formed in the inverted V-shape in such a manner that its outlet port 120a is oriented in the downward direction from the tapered outer surface 202c of the middle part 202b toward the injection port 111a of the fuel injection nozzle 111. Fuel injected from the fuel injection nozzle 111 collides against compressed air which is introduced into the interior of the activating chamber 110 via the passage 120 and thereafter it is deflected downwardly along the tapered outer surface 202c of the middle part 202b. Thus, a large part of fuel thus activated by collision against compressed air is held in the lower space of the activating chamber 110. When the valve 108 is opened, mixing of compressed air in the main combustion chamber 104 with mixture gas in the activating chamber 110 can be smoothly achieved within a short period of time.

It should be noted that the present invention should not be limited only to the case where the engine is provided with a sub-chamber. It may be applied to the case where the engine is not provided with any sub-chamber. However, as far as the engine is provided with any sub-chamber, it is preferable that the latter is designed in such a pattern that swirl is easy to occur, for instance, in the circular cross-sectional shape.

Further, it should be noted that the present invention should not be limited only to the case where the valve body or head portion is formed with a single passage. Alternatively, employment of a plurality of passages may be acceptable.

Further, it should be noted that the present invention should not be limited to a compression ignition type internal combustion engine. Alternatively, it may be applied to a compression ignition type engine in which fuel is injected directly into a main combustion chamber, gasoline engine (Otto cycle engine), an engine of the type which is provided with no precombustion chamber or the like.

When an internal combustion engine as shown in FIGS. 4 to 8 is operated, it is assured that activating of fuel injected into an activating chamber is positively promoted by collision of fuel against compressed air and thereby effective combustion of fuel is achieved, resulting in remarkable reduction of generation of black smoke and hydrocarbon in exhaust gas.

As will be readily apparent from the above description, the internal combustion engine of the invention has the following advantageous features.

(1) Since fuel is premixed and preheated in the activating chamber, it can be satisfactorily activated before ignition takes place.

(2) Since the valve is opened and closed under proper control with the aid of a cam or the like means in accordance with the exact operation timing sequence, the time when ignition takes place with engine can be determined correctly.

(3) Premixed fuel which has been activated under the effect of operation of the valve as mentioned above is introduced into the combustion chamber in accordance with the properly determined ignition timing sequence.

(4) Since ignition time can be determined by actuating the valve at a properly determined time, an occurrence of rapid pressure increase as will be often seen with conventional diesel engine can be avoided and thereby high speed rotation can be achieved just like spark plug type engine.

Accordingly, an advantageous feature of high thermal efficiency inherent to diesel engine and an advantageous feature of high speed and quiet operation inherent to spark plug type engine are obtainable at the same time. Moreover, since a compression ratio can be reduced with diesel engine, an amount of NOx in exhaust gas can be reduced remarkably.

While the present invention has been described above with respect to several preferred embodiments thereof, it should of course be understood that it should not be limited only to them but various changes or modifications may be made in any acceptable manner without departure from the spirit and scope of the invention as defined by the appended claims.

What is claimed is:

1. A fuel valving apparatus for an internal combustion engine which has a cylinder defining a combustion chamber in which a piston is movable, comprising a cylinder head closing the combustion chamber, said head having a top opening with an injection port extending from the top opening into the combustion chamber and defining an intermediate chamber communicating with said injection port, a cylindrical hollow valve holding portion positioned in an opening above the intermediate chamber and having a valve seat, a valve body movable in said valve holding portion having a flange portion engageable and disengageable with said seat so as to position said valve body in respective closed and open positions, said valve body having an interior vaporizing chamber which communicates with said intermediate chamber when said valve body is opened, fuel injection means connected through said valve holding portion communicating with said intermediate chamber when said valve body is closed, and drive means engageable with said valve body to move said valve body between closed and opened positions.

2. A fuel valving apparatus according to claim 1, including a heating element extending through said valve body and into said vaporizing chamber, said valve head and said intermediate chamber comprising a hemispherical precombustion chamber communicating with said injection port.

3. A fuel valving apparatus according to claim 1, wherein said valve holding portion comprises a sleeve positioned in the opening of said head, a guide sleeve arranged inside said sleeve, said valve body being in slidable engagement with said guide sleeve and having a widened portion at its lower end in sliding engagement with said sleeve, said sleeve having a flanged lower end portion forming a seat for said valve body, said valve body having a flange portion engageable with said seat, said vaporizing chamber having thin portions therein and said heater extending into said vaporizing chamber.

4. A fuel valving apparatus according to claim 1, wherein said valve body is hollow, a shaft slidable in said hollow portion of said valve body and having a widened shaft portion and a narrow shaft portion adjacent its lower end, means for rotating said shaft, said valve body having a fuel injection port extending from its exterior into the hollow portion thereof in which said shaft is positioned, said fuel injection means comprising an opening in said valve holding portion, an injection nozzle extending through said opening, said valve body having a widened portion positionable at the opening of said valve holding portion slidable with the fuel injection portion on said valve body for the passage of fuel through said valve body to the hollow interior, the hollow interior opening into said intermediate chamber, said shaft being rotatable to rotate the amount of fuel injected through the hollow passage of said valve body.

5. A fuel valving apparatus according to claim 1, wherein said vaporizing chamber is of uniform diameter, said valve body including a widened portion disposable in said vaporizing chamber and a shank portion of lesser diameter than said widened portion, said valve holding portion having a fuel injection opening of said vaporizing chamber to the exterior, said fuel injection means including a fuel nozzle extending into the opening, said opening being blockable by positioning the widened portion of said valve body over the fuel injection opening.

6. A fuel valving apparatus according to claim 1, wherein said valve body includes a fuel passage therethrough, a control sleeve member positioned around said valve body in said valve holding portion, said fuel injection means including a nozzle for fuel extending through said valve holding portion into said vaporizing chamber, said fuel control sleeve having an opening communicating with said vaporizing passage through the internal passage of said valve body.

7. A fuel vaporizing apparatus according to claim 1, wherein said valve body also includes a blocking member for blocking the opening of said fuel injection passage when said valve is in an open position.

8. A fuel valving apparatus according to claim 1, wherein said valve body includes a triangular intermediate portion located in said vaporizing chamber followed at its lower end by a flange portion and including an opening through said valve member extending from said intermediate passage upwardly through said valve body at a right angle into said triangular portion to said vaporizing chamber.

* * * * *